US009219796B2

(12) United States Patent
Shin

(10) Patent No.: US 9,219,796 B2
(45) Date of Patent: Dec. 22, 2015

(54) METHOD AND APPARATUS FOR OBTAINING INFORMATION OF USER EQUIPMENT IN COMMUNICATION SYSTEM

(75) Inventor: Ki Eun Shin, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/407,227

(22) Filed: Feb. 28, 2012

(65) Prior Publication Data

US 2013/0012240 A1    Jan. 10, 2013

(30) Foreign Application Priority Data

Jul. 6, 2011 (KR) .......................... 10-2011-0066849

(51) Int. Cl.
| H04W 24/00 | (2009.01) |
| H04M 3/42 | (2006.01) |
| H04L 29/08 | (2006.01) |
| H04L 29/06 | (2006.01) |
| H04W 4/02 | (2009.01) |

(52) U.S. Cl.
CPC .......... *H04L 67/325* (2013.01); *H04L 65/1073* (2013.01); *H04L 67/18* (2013.01); *H04W 4/02* (2013.01)

(58) Field of Classification Search
CPC ........ H04W 4/025; H04L 67/18; H04L 67/26
USPC ........................................... 455/456.3, 414.2
See application file for complete search history.

(56) References Cited

U.S. PATENT DOCUMENTS

| 2004/0054468 A1 | 3/2004 | Yamada et al. |
| 2008/0201647 A1 | 8/2008 | Lagerstedt et al. |
| 2008/0233921 A1 * | 9/2008 | Myllynen et al. .............. 455/411 |
| 2009/0197619 A1 * | 8/2009 | Colligan et al. ............ 455/456.3 |
| 2010/0082247 A1 | 4/2010 | Klein et al. |
| 2010/0106801 A1 | 4/2010 | Bliss et al. |
| 2010/0293029 A1 | 11/2010 | Olliphant |
| 2011/0161167 A1 * | 6/2011 | Jallapuram ................. 705/14.49 |
| 2013/0006732 A1 * | 1/2013 | Chen et al. .................... 705/14.5 |

FOREIGN PATENT DOCUMENTS

KR    10-2004-0047736 A    6/2004

OTHER PUBLICATIONS

Hyoungtae Cho, Coinonia: Privacy-Aware Meeting Scheduler Based on Location-Based Services for Mobile Users, CiteSeer, Jan. 2011, pp. 1-6.
Go Yun Mi, Oh Ki Nam, and Kwon Kyung Hee, Implementation of Mobile Mash-up Service for Scheduling Using GPS and OpenAPI, journal of KIISE, vol. 35, No. 1 (D), Jun. 2008, pp. 281-284.

* cited by examiner

*Primary Examiner* — Omoniyi Obayanju
(74) *Attorney, Agent, or Firm* — Jefferson IP Law, LLP

(57) ABSTRACT

A method and an apparatus for obtaining information of a user equipment in a communication system are provided. The method includes registering schedule information containing place information by the user equipment, adding service information to the schedule information by the user equipment when a peripheral service server receives service information corresponding to the place information, and displaying the service information by the user equipment when the schedule information is searched. A user of the UE may automatically add the location based information to the UE corresponding to schedule information to manage it without separately searching information or recording the information, thus improving convenience.

39 Claims, 14 Drawing Sheets

METHOD AND APPARATUS FOR OBTAINING INFORMATION OF USER EQUIPMENT IN COMMUNICATION SYSTEM

PRIORITY

This application claims the benefit under 35 U.S.C. §119 (a) of a Korean patent application filed on Jul. 6, 2011 in the Korean Intellectual Property Office and assigned Serial No. 10-2011-0066849, the entire disclosure of which is hereby incorporated by reference.

BACKGROUND OF THE INVENTION

1. Field of the Invention

The present invention relates to a communication system. More particularly, the present invention relates to a method for obtaining information of a User Equipment (UE) in a communication system, and an apparatus thereof 2. Description of the Related Art Recently, various advanced functions have been added to a UE in a communication system such that the UE performs a composite function. That is, a current UE is able to provide various convenience functions such as a message transmission/reception function, a wireless Internet function, a phonebook management function, a schedule management function, and a navigation function as well as a call function. Also, the UE stores and manages schedules of a user such as personal trips, shopping, and meetings through the schedule management function. Further, the UE is able to search for information requested by a user through a wireless Internet function. That is, the UE may search for additional information, for example, a phone number, a web page address, and costs of a restaurant or a hotel in a certain location associated with a specific place according to a request of the user.

However, the foregoing UE has a problem in that it can not associate information of a plurality of functions with each other. That is, the UE does not associate additional information of a related place with schedule information that it is managing. This may deteriorate use efficiency of the UE. In other words, the UE stores schedule information and additional information, and a user of the UE should associate additional information with the schedule information to avoid conflicts based on the additional information. Accordingly, use of the schedule information and the additional information in the UE requires the user to memorize both pieces of information separately, which results in their inefficient use.

SUMMARY OF THE INVENTION

Aspects of the present invention are to address at least the above-mentioned problems and/or disadvantages and to provide at least the advantages described below. Accordingly, an aspect of the present invention is to provide an apparatus for obtaining information of a User Equipment (UE) in a communication system that may improve use efficiency of the UE, and an apparatus thereof.

In accordance with an aspect of the present invention, a method for obtaining information of a UE in a communication system is provided. The method includes registering schedule information containing place information by the user equipment, adding service information to the schedule information by the user equipment when a peripheral service server receives service information corresponding the place information, and displaying the service information by the user equipment when the schedule information is searched.

In accordance with another aspect of the present invention, an apparatus for obtaining information of a UE in a communication system is provided. The apparatus includes a radio frequency communication unit accessing a peripheral server, a controller registering schedule information containing place information and adding service information corresponding to the place information to the schedule information when the peripheral server receives the service information, and a display unit displaying the service information under control of the controller when the schedule information is searched.

A method and an apparatus for obtaining information of a UE in a communication system according to an exemplary embodiment of the present invention may associate location based information corresponding to a related place with schedule information to manage the location based information. That is, a user of the UE may easily obtain location based information in the UE without separately searching information or recording the information. Through this, the UE may be managed by automatically adding the location based information to the UE corresponding to schedule information. Owing to this, convenience for the user may be improved in the UE. In addition, use efficiency of the UE may be enhanced.

Other aspects, advantages, and Salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
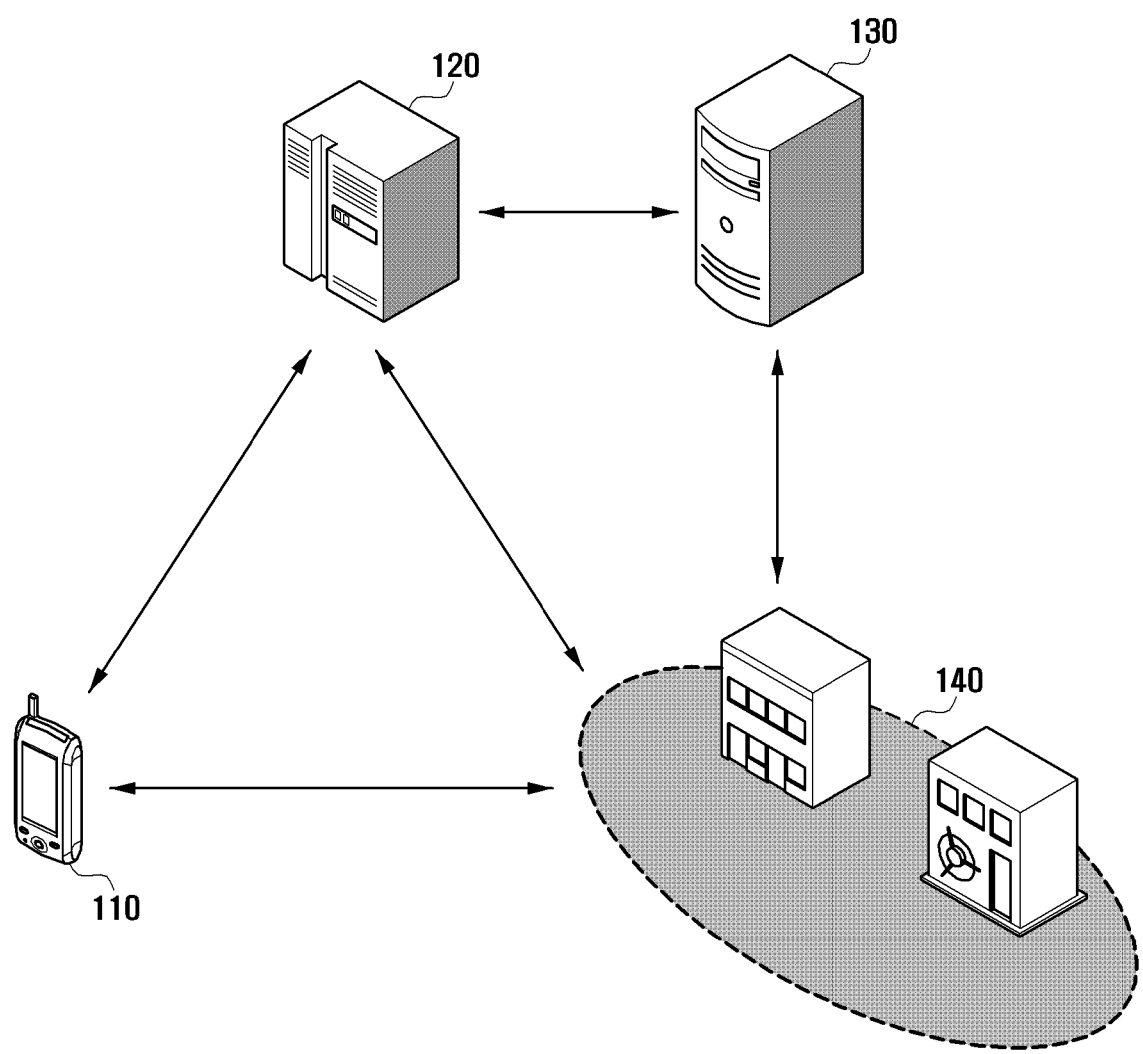
FIG. 1 is a view illustrating a configuration of a communication system according to a first exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the term "schedule information" refers to a time plan prepared by a user as information recorded in a User Equipment (UE). For example, the schedule information may be plans associated with a trip, a shopping event, or a meeting. At this time, the schedule information is optionally determined in the UE by the user and contains a title indicating a plan of the user, time information, and place information in which the plan of the user will be achieved. For example, the title may include a text such as "trip," "shopping," or "meeting." The time information may include a combination of a calendar date and the time of time. That is, the time information may indicate a specific point in time such as 12:00 p.m., May 27, 2011. The time information may indicate at least one time interval, such as May 27, 2011 to May 29, 2011. Furthermore, the place information may include a text such as "Pusan Haeundae" or "Gangnam subway station." Also, the place information may include coordinate data including longitude, latitude, and height.

As used herein, the term "service information" refers to location based information corresponding to schedule information in a UE. At this time, the service information indicates services provided from respective service providers. Here, the service provider indicates a subscriber or enterprise alliance representing a hotel, a restaurant, a department store, and the like. For example, the service information may contain at least one of location information, menus, costs, phone numbers, or a web page address of the service provider.

FIG. 1 is a view illustrating a configuration of a communication system according to a first exemplary embodiment of the present invention.

Referring to FIG. 1, a communication system includes a UE 110, a calendar server 120, a registration server 130, and a service provider 140.

The UE 110 executes a calendar application to manage schedule information. In an exemplary implementation, the calendar application may be installed in the UE 110 upon manufacturing the UE 110. Alternatively, the calendar application may be downloaded or otherwise installed at the UE 110 at a time after manufacturing. The UE 110 stores the schedule information and displays the schedule information as needed or as requested. The UE 110 periodically communicates with the calendar server 120 to perform synchronization. When a user registers schedule information in the UE 110, the UE 110 transmits the schedule information to the calendar server 120. When the calendar server 120 receives service information corresponding to the schedule information, the UE 110 may add and/or manage the service information corresponding to the schedule information.

The calendar server 120 is associated with the UE 110 through the calendar application. The calendar server 120 manages schedule information independently from the UE 110. That is, when the UE 110 executes the calendar application, the calendar server 120 accesses the UE 110. When a user registers schedule information in the UE 110, the calendar server 120 registers the schedule information independently from the UE 110. To do this, the calendar server 120 periodically communicates with the UE 110 to perform synchronization. Further, when the UE 110 receives the schedule, the calendar server 120 stores the schedule information. The calendar server 120 may request service information corresponding to the schedule information from the registration server 130. When the registration server 130 or the service provider 140 receives service information corresponding to the schedule information, the calendar server 120 may add the service information to the schedule information to manage the service information. The calendar server 120 may transmit service information to the UE 110. That is, the calendar server 120 may provide the service information to the UE 110 in a push scheme.

The registration server 130 manages the service provider 140. The registration server 130 stores and manages general information of the service provider 140.

In this case, the general information contains identification information, location information, and category information of the service provider 140. The category information may include information for classifying the service provider 140 into a business type such as a restaurant, a hotel, a theater, and the like. At this time, when the calendar server 120 requests service information corresponding to the schedule information, the registration server 130 may search a service provider 140 corresponding to the schedule information using the general information, and request service information from the service provider 140. The registration server 130 may further store and manage previously registered service information as well as the general information of the service provider 140. When the calendar server 120 requests service information corresponding to the schedule information, the registration server 130 may search for the service provider 140 corresponding to schedule information using general information to detect service information of the service provider 140. In addition, the registration server 130 may transmit service information corresponding to the schedule information to the calendar server 120.

The service provider 140 stores and manages respective general information and service information. At this time, the service provider 140 may previously register the general information in the registration server 130. The service provider 140 may periodically update the service information. When the registration server 130 requests the service information, the service provider 140 may transmit the service information together with the general information to the calendar server 120 or the registration server 130. The service provider 140 may periodically register the service information in the registration server 130 together with the general information.

In an exemplary embodiment, the UE 110 may obtain service information provided from the service provider 140 in various schemes. For example, the UE 110 may directly obtain the service information from the service provider 140. Also, the UE 110 may obtain the service information from the registration server 130 in which the service information of the service provider 140 was previously registered. Hereinafter, two exemplary methods for obtaining service information by a UE in a communication system will be described. However, the present invention is not limited thereto.

Figure 2:
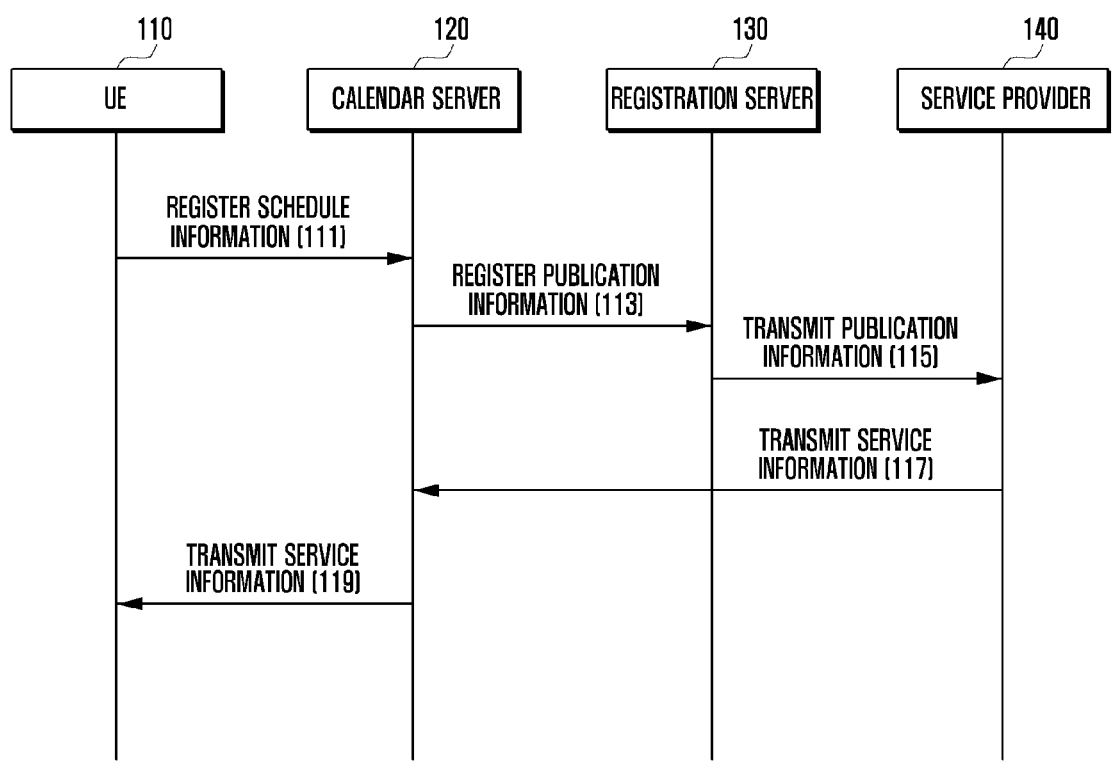
FIG. 2 is a flow diagram illustrating a method for obtaining information of a User Equipment (UE) in a communication system according to the first exemplary embodiment of the present invention.

FIG. 2 is a flow diagram illustrating a method for obtaining information of a UE in a communication system according to a first exemplary embodiment of the present invention.

Referring to FIG. 2, a UE 110 registers schedule information in a calendar server 120 in step 111. That is, the UE 110 executes a calendar application according to a request of a user to register the schedule information. At this time, the UE 110 stores schedule information corresponding to a previously stored calendar. In this case, the schedule information may include a title, time information, and place information. If the place information of the schedule information includes text, the UE 110 may analyze the text to detect coordinate data and store the coordinate data instead of the text as the place information of the schedule information. The UE 110 transmits the schedule information to the calendar server 120. In this case, the UE 110 transmits identification information of the UE 110 together with the schedule information. When the calendar server 120 receives the schedule information, the calendar server 120 stores the schedule information. Here, the place information may include text or coordinate data. In addition, if the place information of the schedule information includes text, the calendar server 120 may analyze the text to detect coordinate data, and store the coordinate data instead of the text as the place information of the schedule information.

If the schedule information is registered, the calendar server 120 extracts publication information from the schedule information and registers the extracted publication information in the registration server 130 in step 113. That is, the calendar server 120 posts the publication information to the registration server 130 to publish it for the service provider 140. The publication information contains location information of the schedule information and category information corresponding to the schedule information. At this time, the publication information does not contain identification information of the UE 110. As such, the calendar server 120 may add virtual information instead of the identification information of the UE 110 to the publication information and transmit the publication information to the registration server 130. In this case, the calendar server 120 may store the virtual information corresponding to the identification information of the UE 110.

Subsequently, if the publication information is registered, the registration server 130 transmits the publication information to the service provider 140 in step 115. At this time, the registration server 130 stores general information of the service provider 140. In this case, the general information of the service provider 140 may contain identification information, location information, and category information of the service provider 140. That is, the registration server 130 searches for the service provider 140 having location information corresponding to place information of the publication information. Here, the registration server 130 may determine whether the location information of the service provider 140 is located within a preset distance from the place information of the publication information. If the location information of the service provider 140 is located within the preset distance from the place information of the publication information, the registration server 130 may detect the service provider 140. Further, the registration server 130 may search for a service provider 140 having the same category information as that of the publication information. The registration server 130 may transmit publication information to which virtual information is added to the service provider 140.

The service provider 140 transmits service information to the calendar server 120 in step 117. At this time, the service provider 140 stores general information and service information. Here, the service information indicates a service provided from the service provider 140. For example, the service information may contain at least one of location information, menus, costs, a phone number or a web page address of the service provider 140. That is, the service provider 140 transmits virtual information added to the publication information together with the service information. Here, the service provider 140 may further transmit not only service information but also general information.

Subsequently, if the service information is received, the calendar server 120 transmits the service information to the UE 110 in step 119. At this time, the calendar server 120 adds the service information to the schedule information of the UE 110. Here, the calendar server 120 recognizes identification information of the UE 110 corresponding to the virtual information received together with the service information. Further, the calendar server 120 transmits the service information using the identification information of the UE 110. Through this, the UE 110 adds user information to the schedule information and manages the user information together with the schedule information through a calendar application.

This exemplary embodiment has illustrated that the calendar server 120 adds virtual information instead of the identification information of the UE 110 to the publication information when the publication information is registered in the registration server 130. However, the present invention is not limited thereto. That is, when the publication information is registered in the registration server 130, although the calendar server 120 registers the publication information based on the identification information of the UE 110, the present invention may be implemented. To do this, upon transmitting the publication information to the service provider 140, the registration server 120 may add optional virtual information instead of the identification information of the UE 110 to the publication information. Here, the registration server 130 may store virtual information corresponding to the identification information of the UE 110. Further, when receiving the publication information, the service provider 140 may transmit the service information to the registration server 130 together with the virtual information. At this time, if the service information is received, the registration server 130 may transmit the service information to the calendar server 120 using identification information of the UE 110 corresponding to the virtual information. In other words, the service information of the service provider 140 may be transmitted to the calendar server 120 via the registration server 130.

Figure 3:
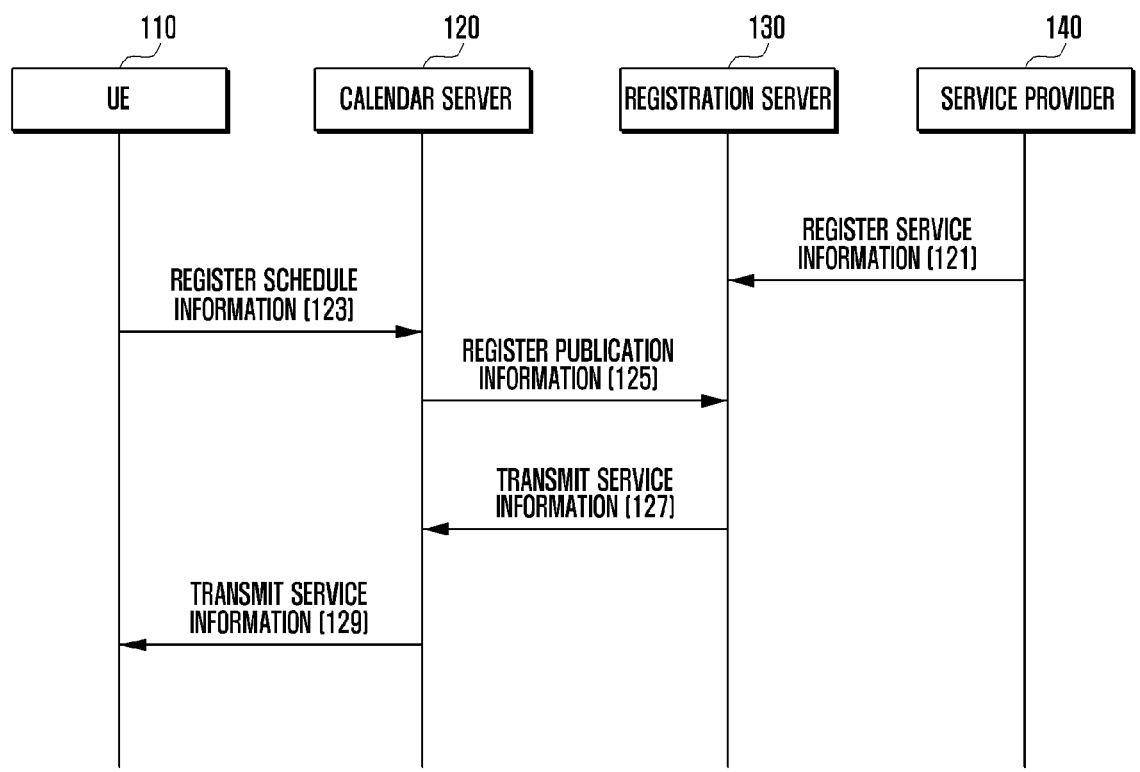
FIG. 3 is a flow diagram illustrating a method for obtaining information of a UE in a communication system according to the first exemplary embodiment of the present invention.

FIG. 3 is a flow diagram illustrating a method for obtaining information of a UE in a communication system according to the first exemplary embodiment of the present invention.

Referring to FIG. 3, a service provider 140 registers service information in a registration server 130 in step 121. At this time, the service provider 140 stores respective general information and service information. Here, the general information contains Identification (ID) information, location information, and category information of the service provider 140. The service information indicates a service provided from the service provider 140. For example, the service information may contain at least one of location information, menus, costs, a phone number, or a web page address of the service provider 140. The service provider 140 may register not only the respective service information but also general information in the registration server 130. At this time, the service provider 140 may periodically update the service information. Further, the service provider 140 may update the service information in the registration server 130.

The UE 110 registers schedule information in the calendar server 120 in step 123. That is, the UE 110 executes a calendar application according to a request of a user to register the schedule information. At this time, the UE 110 stores the schedule information corresponding to a previously stored calendar. Here, the schedule information may include a title, time information, and place information. If the place information of the schedule information includes text, the UE 110 may analyze the text to detect coordinate data, and store the coordinate data instead of the text as the place information of the schedule information. Further, the UE 110 transmits the schedule information to a calendar server 120. In this case, the UE 110 transmits ID information of the UE 110 together with the schedule information. When the calendar server 120 receives the schedule information, the calendar server 120 stores the schedule information. Here, the place information may include text or coordinate data. If the place information of the schedule information includes text, the calendar server 120 may analyze the text to detect coordinate data, and store the coordinate data instead of the text as the place information of the schedule information.

Subsequently, if the schedule information is registered, the calendar server 120 extracts publication information from the schedule information and registers the extracted publication information in the registration server 130 in step 125. That is, the calendar server 120 posts the publication information to the registration server 130 to publish it for the service provider 140. In this case, the publication information contains place information of the schedule information and category information corresponding to the schedule information. At this time, the publication information does not contain ID information of the UE 110. That is, the calendar server 120 may add virtual information instead of the ID information of the UE 110 to the publication information, and transmit the publication information to the registration server 130. Here, the calendar server 120 may store the virtual information corresponding to the ID information of the UE 110.

If the publication is registered, the registration server 130 transmits the service information to the calendar server 120 in step 127. At this time, the registration server 130 searches for a service provider 140 having location information corresponding to the place information of the publication information. The registration server 130 may determine whether location information of the service provider 140 is located within a preset distance from the place information of the publication information. When the location information of the service provider 140 is located within the preset distance from the place information of the schedule information, the registration server 130 may detect the service provider 140. Furthermore, the registration server 130 may search for a service provider having the same category information as that of the publication information. The registration server 130 detects and transmits service information of the service provider 140 to the calendar server 120. In this case, the registration server 130 transmits virtual information added to the publication information together with the service information. The registration server 130 may further transmit general information as well as the service information.

Subsequently, if the service information is received, the calendar server 120 transmits the service information to the UE 110 in step 129. At this time, the calendar server 120 adds the service information to the schedule information of the UE 110. Here, the calendar server 120 recognizes ID information of the UE 110 corresponding to virtual information received together with the service information. The calendar server 120 transmits the service information using the ID information of the UE 110. Through this, the UE 110 adds user information to the schedule information, and manages the user information together with the schedule information through a calendar application.

The foregoing example has illustrated that the UE obtains service information provided from a service provider. However, the present invention is not limited thereto. That is, although the service provider does not directly provide the service information, the present invention may be implemented. Through this, although the registration server does not store at least one of general information or service information of the service provider, the UE may obtain the service information of the service provider.

Figure 4:
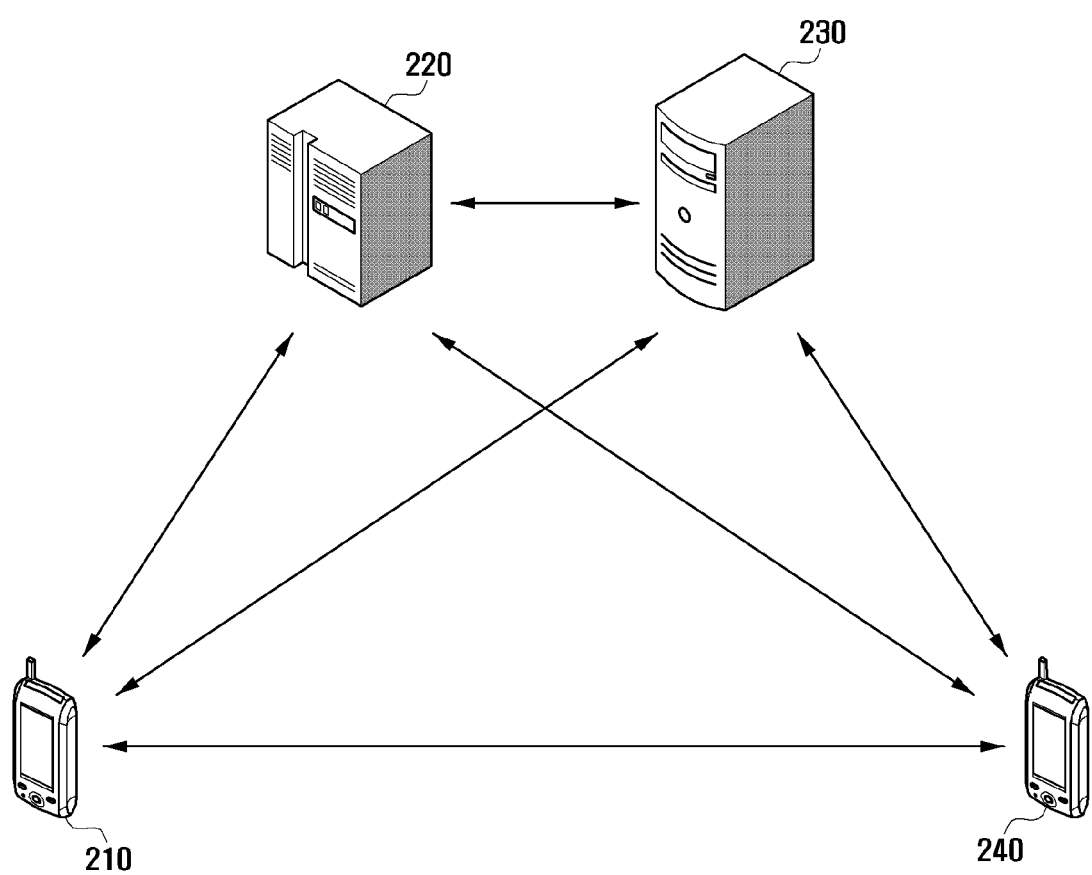
FIG. 4 is a view illustrating a configuration of a communication system according to a second exemplary embodiment of the present invention.

FIG. 4 is a view illustrating a configuration of a communication system according to a second exemplary embodiment of the present invention.

Referring to FIG. 4, a communication system includes a UE 210, a calendar server 220, a registration server 230, and another UE 240.

The UE 210 executes a calendar application to manage schedule information. Here, when manufacturing the UE 210, the calendar application may be installed in the UE 210. Alternatively, the calendar application may be downloaded or otherwise installed at the UE 210 at a time after manufacturing. The UE 210 stores the schedule information and displays the schedule information as needed. Further, the UE 210 periodically communicates with the calendar server 220 to perform synchronization. When the schedule information is registered in the UE 210, the UE 210 transmits the schedule information to the calendar server 220. Moreover, when the calendar server 220 receives service information corresponding to the schedule information, the UE 210 may add the service information to the schedule information to manage the service information.

The calendar server 220 is associated with the UE 210 through the calendar application. The calendar server 220 manages schedule information independently from the UE 210. That is, when the UE 210 executes the calendar application, the calendar server 220 accesses the UE 210. When a user registers schedule information in the UE 210, the calendar server 220 registers the schedule information independently from the UE 210. To do this, the calendar server 220 periodically communicates with the UE 210 to perform synchronization. Further, when the UE 210 receives the schedule, the calendar server 220 stores the schedule information.

The calendar server 220 may request service information corresponding to the schedule information from the registration server 230. When the registration server 230 or the other UE 240 receives service information corresponding to the schedule information, the calendar server 220 may add the service information to the schedule information to manage the service information. The calendar server 220 may transmit service information to the UE 210. That is, the calendar server 220 may provide the service information to the UE 210 in a push scheme.

The registration server 230 manages the other UE 240. For example, the registration server 230 stores and manages general information of the other UE 240. In this case, the registration server 230 may be a Social Networking Service (SNS) server supporting SNS. The general information may include ID information of the other UE 240. Here, the registration server 230 may manage the UE 210 and the UE 240 corresponding the other UE 240 to the UE 210. For example, the registration server 230 may manage the other UE 240 as a follower of the UE 210. Further, if the calendar server 220 requests service information corresponding to schedule information, the registration server 230 may request service information from the other UE 240. In the meantime, when registration server 230 receives the service information, the registration server 230 may transmit the service information corresponding to the schedule information to the calendar server 220.

The other UE 240 may access the registration server 230. At this time, the other UE 240 may access the registration 230 to use an SNS. If the registration server 230 requests service information corresponding to the schedule information, the other UE 240 transmits the service information to the registration server 230. That is, the other UE 240 may display schedule information of the UE 210. When a text is input by a user of the other UE 240, the other UE 240 may transmit the text as service information corresponding to the schedule information. Here, the user of the other UE 240 may determine the schedule information of the UE 210, and create a text in the other UE 240 based on experience and knowledge.

In an exemplary embodiment, the UE 210 may obtain service information provided from the other UE 240 in various schemes in a communication system. That is, the UE 210 may obtain the service information using an SNS. An exemplary procedure of obtaining service information by the UE 210 will be described below. However, the present invention is not limited thereto.

Figure 5:
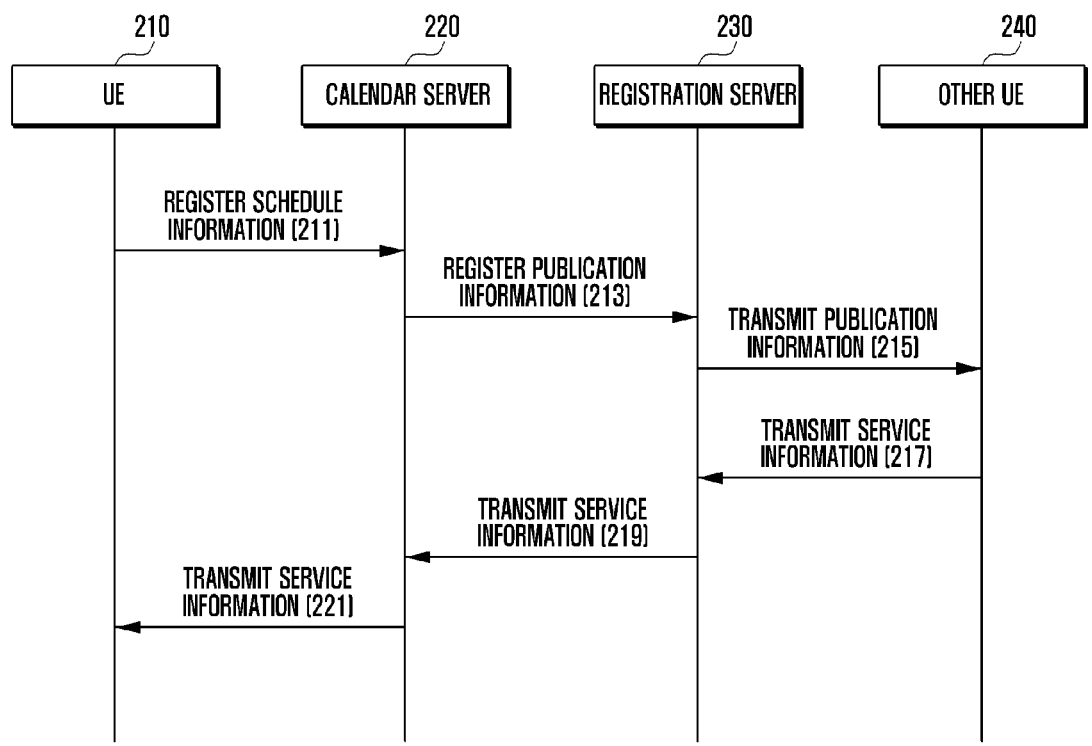
FIG. 5 is a flow diagram illustrating a method for obtaining information of a UE in a communication system according to the second exemplary embodiment of the present invention.

FIG. 5 is a flow diagram illustrating a method for obtaining information of a UE in a communication system according to a second exemplary embodiment of the present invention.

Referring to FIG. 5, a UE 210 first registers schedule information in a calendar server 220 in step 211. That is, the UE 210 executes a calendar application according to a request of a user to register the schedule information. At this time, the UE 210 stores schedule information corresponding to a previously stored calendar. In this case, the schedule information may include a title, time information, and place information. If the place information of the schedule information includes text, the UE 100 may analyze the text to detect coordinate data and store the coordinate data instead of the text as the place information of the schedule information. The UE 210 transmits the schedule information to the calendar server 220. In this case, the UE 210 transmits identification information of the UE 210 together with the schedule information. When the calendar server 220 receives the schedule information, the calendar server 220 stores the schedule information. Here, the place information may include text or coordinate data. In addition, if the place information of the schedule information includes text, the calendar server 220 may analyze the text to detect coordinate data, and store the coordinate data instead of the text as the place information of the schedule information.

If the schedule information is registered, the calendar server 220 extracts publication information from the schedule information and registers the extracted publication information in the registration server 230 in step 213. That is, the calendar server 220 posts the publication information to the registration server 230 to publish it for the other UE 240. In this case, the publication information contains ID information of the UE 210, the place information of the schedule information, and category information corresponding to the schedule information.

Subsequently, if the publication information is registered, the registration server 230 transmits the publication information to the other UE 240 in step 215. At this time, the registration server 230 stores general information of the other UE 240. In this case, the general information of the other UE 240 contains identification information, location information, and category information of the other UE 240. That is, the registration server 230 searches the other UE 240 registered corresponding to the UE 210. Further, the registration server 230 transmits ID information of the UE 210 together with the service information using ID information of the other UE 240.

The other UE 240 transmits service information to the registration server 230 in step 217. Here, the service information indicates a service provided from the service provider (not shown). For example, the service information may contain at least one of location information, menus, costs, a phone number or a web page address of the service provider.

Subsequently, if the service information is received, the registration server 230 transmits the service information to the calendar server 220 in step 219. At this time, the registration server 230 transmits ID information of the UE 210 together with the service information.

If the service information is received, the calendar server 220 transmits the service information to the UE 210 in step 221. At this time, the calendar server 220 adds the service information to the schedule information of the UE 210. Moreover, the calendar server 220 transmits service information using ID information of the UE 210. Through this, the UE 210 adds user information to the schedule information, and may manage the user information together with the schedule information through a calendar application.

The foregoing exemplary embodiments have illustrated that a UE registers schedule information in a calendar server to obtain service information corresponding to the schedule information. However, the present invention is not limited thereto. That is, although the UE registers the schedule information in the calendar server, the present invention may be realized. Through this, although the calendar service is not included in a communication system, the UE may obtain service information.

Figure 6:
FIG. 6 is a view illustrating a configuration of a communication system according to a third exemplary embodiment of the present invention.

FIG. 6 is a view illustrating a configuration of a communication system according to a third exemplary embodiment of the present invention.

Referring to FIG. 6, the communication system includes a UE 310 and a registration server 330.

The UE 310 executes a calendar application to manage schedule information. Here, when manufacturing the UE 310, a calendar application may be installed in the UE 310. Alternatively, the calendar application may be downloaded or otherwise installed at the UE 310 at a time after manufacturing. Using the calendar application, the UE 310 stores the schedule information, and displays the schedule information as needed. Furthermore, the UE 310 may transmit place information of the schedule information to request service information. In addition, when the registration server 330 receives the service information corresponding to the schedule information, the UE 310 may add the service information to the schedule information to manage the service information.

The registration server 330 manages the service information. In an exemplary implementation, the registration server 330 may be a web server supporting internet communication. Further, when the UE 310 requests service information corresponding to schedule information, the registration server 330 may drive a search engine to search for service information corresponding to the schedule information. The registration server 330 may transmit service information according to a searched result to the UE 310.

Figure 7:
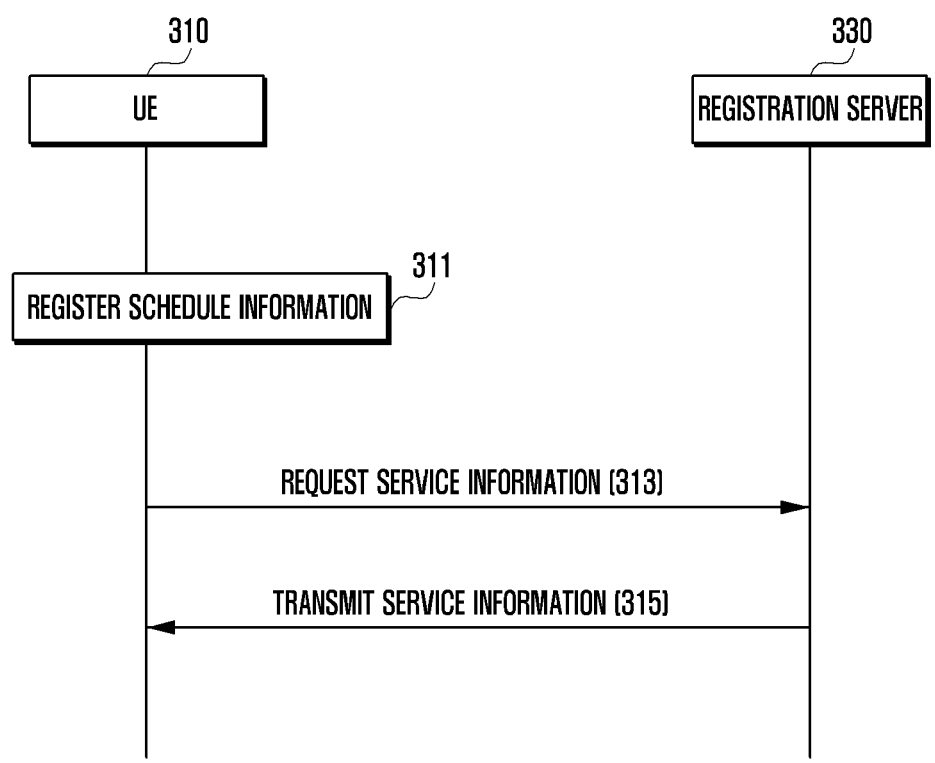
FIG. 7 is a flow diagram illustrating a method for obtaining information of a UE in a communication system according to the third exemplary embodiment of the present invention.

FIG. 7 is a flow diagram illustrating a method for obtaining information of a UE in a communication system according to the third exemplary embodiment of the present invention.

Referring to FIG. 7, a UE 310 first registers schedule information in step 311. That is, the UE 310 executes a calendar application according to a user request to register the schedule information. At this time, the UE 310 stores the schedule information corresponding to a previously stored calendar. Here, the schedule information may include a title, time information, and place information. Furthermore, if the place information of the schedule information includes text, the UE 310 may analyze the text to detect coordinate data, and store the coordinate data instead of the text as the place information of the schedule information.

Subsequently, if the schedule information is registered, the UE 310 requests service information corresponding to the schedule information from the registration server 330 in step 313. At this time, the UE 310 determines whether the schedule information contains the place information. If the schedule information contains the place information, the UE 310 requests the service information from the registration server 330. That is, the UE 310 transmits the place information of the schedule information to the registration server 330.

Subsequently, if the service information is requested, the registration server 330 transmits the service information to the UE 310 in step 315. That is, when the UE 310 receives the place information, the registration server 330 may drive a search engine to search for service information corresponding to the place information. Moreover, the registration server 330 may transmit service information according to the searched result to the UE 310.

Figure 8:
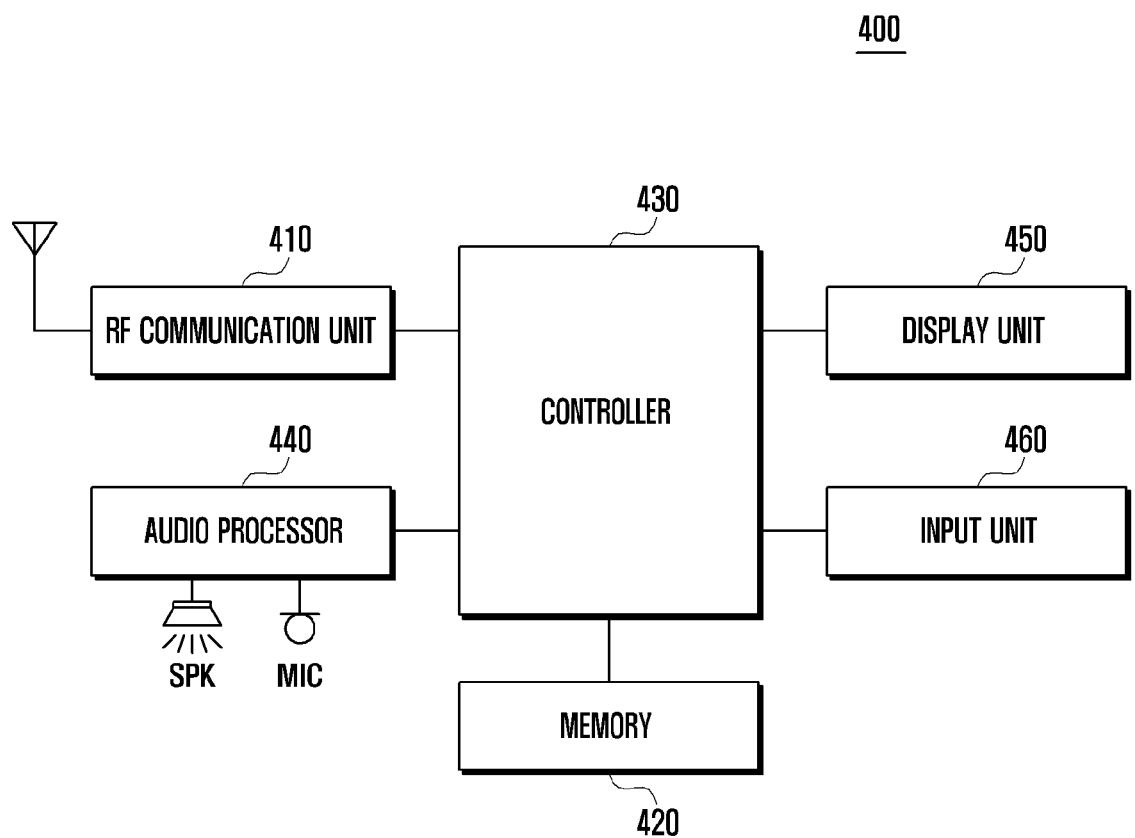
FIG. 8 is a view illustrating a configuration of a UE according to an exemplary embodiment of the present invention.

FIG. 8 is a view illustrating a configuration of a UE according to an exemplary embodiment of the present invention.

Referring to FIG. 8, the UE 400 includes a Radio Frequency (RF) communication unit 410, a memory 420, a controller 430, an audio processor 440, a display unit 450, and an input unit 460.

The RF communication unit 410 performs an RF communication function of the UE 400. The RF communication unit 410 may include an RF transmitter for up-converting a frequency of a transmitted signal and for amplifying the signal, and an RF receiver for low-noise-amplifying a received signal and for down-converting the signal.

The memory 420 may consist of a program memory and a data memory. The program memory stores programs for controlling a general operation of the UE 400. At this time, the program memory may store a calendar application according to an exemplary embodiment of the present invention. The data memory stores data created during execution of programs. The memory 420 may store schedule information according to an exemplary embodiment of the present invention. Further, the memory 420 may store service information as well as the schedule information according to an exemplary embodiment of the present invention.

The controller 430 controls an overall operation of the UE 400. The controller 430 includes a data processor composed of a transmitter for encoding and modulating a transmitted signal and a receiver for demodulating and decoding a received signal. In this case, the data processor may be composed of a modem and a codec. The codec includes a data codec for processing packet data and an audio codec for processing an audio signal such as voices.

The controller 430 may execute a calendar application to manage schedule information according to an exemplary embodiment of the present invention. At this time, the controller 430 may access the registration server 330 through the Internet. Moreover, when the UE 400 registers the schedule information, the controller 430 may transmit place information of the schedule information to the registration server 330. The controller 430 may periodically communicate with the calendar server 120 or 220 to perform synchronization. When registering the schedule information in the UE 400, the controller 430 may transmit the schedule information to the calendar server 120 or 220. When the calendar server 120, 220 or the registration server 130, 230, or 330 receives service information corresponding to place information, the controller 430 may add service information to the schedule information. Through this, upon searching the schedule information, the controller 430 may display the service information together with the schedule information according to an exemplary embodiment of the present invention. Furthermore, the controller 430 may share service information with another UE 240 through an SNS according to an exemplary embodiment of the present invention. In addition, the controller 430 may access the service provider 140 using service information.

The audio processor 440 plays an audio signal received from the audio codec of the data processor through a speaker (SPK) or transmits a transmission audio signal created from a microphone (MIC) to an audio codec of the data processor.

The display unit 450 displays user data output from the controller 430. The display unit 450 may use a Liquid Crystal Display (LCD). In this case, the display unit 450 may include an LCD controller, a memory for storing image data, and an LCD display element. When the LCD is implemented by a touch screen scheme, it may act as an input unit.

The input unit 460 may be composed of keys for inputting numeric and character information and function keys for setting various functions.

Figure 9:
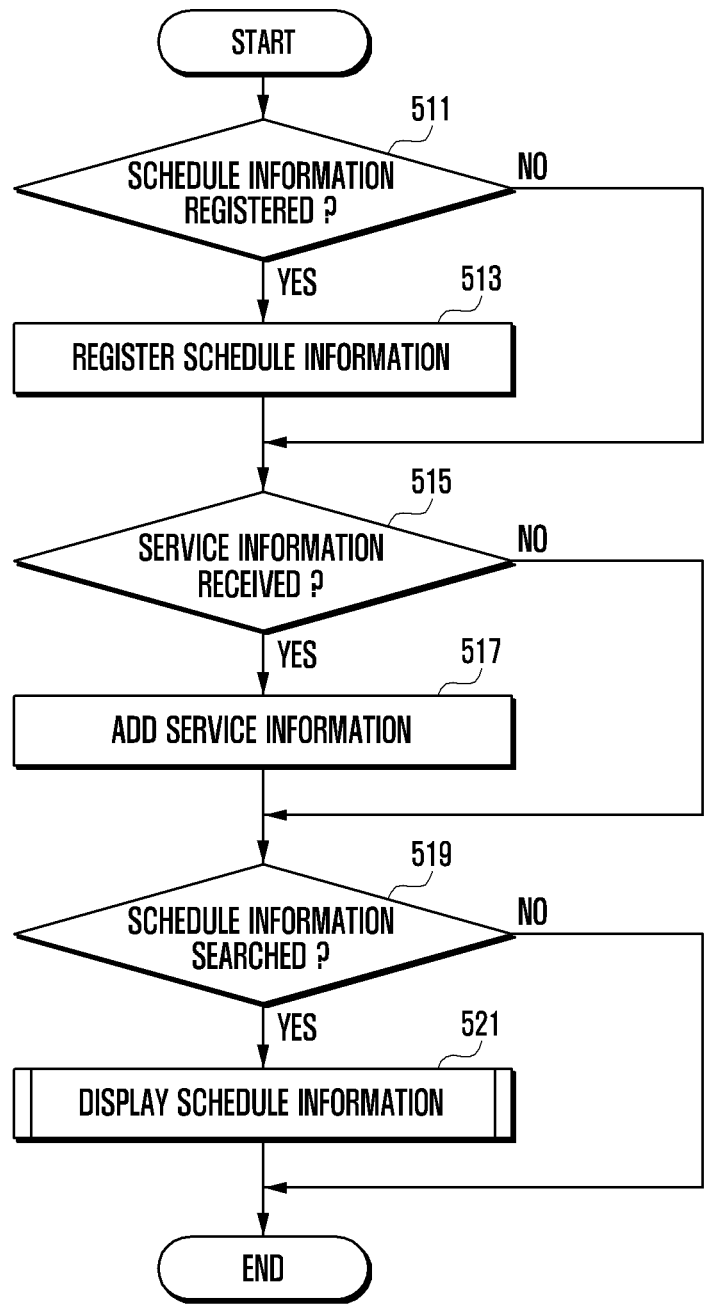
FIG. 9 is a flowchart illustrating a method for obtaining information of a UE in a communication system according to the first exemplary embodiment and the second exemplary embodiment of the present invention.
Figure 12:
FIG. 12 to FIG. 14 are views illustrating a method for obtaining information of a UE in a communication system according to exemplary embodiments of the present invention.
Figure 13:
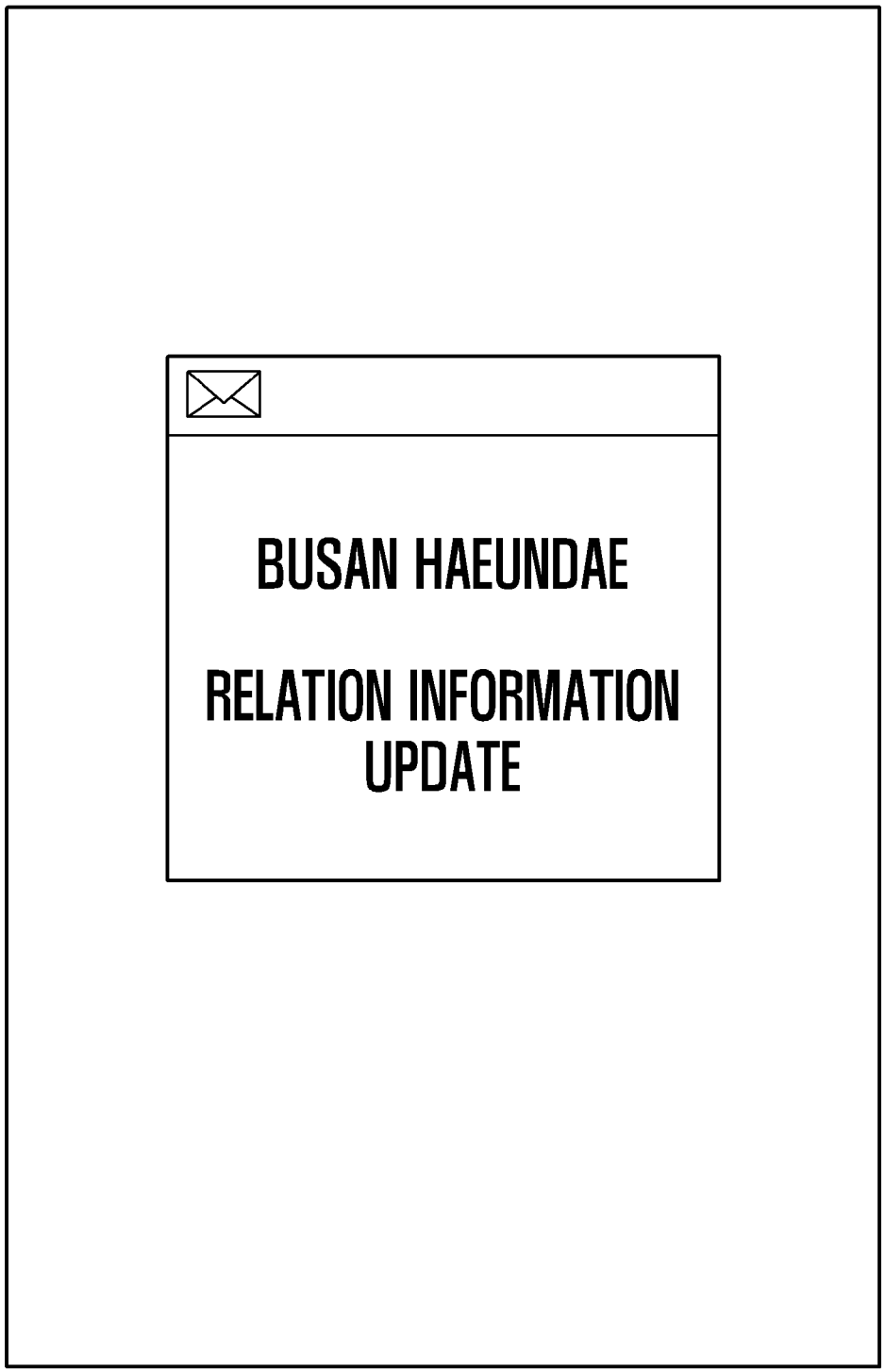
Figure 14:

FIG. 9 is a flowchart illustrating a method for obtaining information of a UE in a communication system according to the first exemplary embodiment and the second exemplary embodiment of the present invention. FIG. 12 to FIG. 14 are views illustrating a method for obtaining information of a UE in a communication system according to exemplary embodiments of the present invention.

Referring to FIG. 9, a controller 430 registers schedule information in step 511. That is, if a request for registering the schedule information is received through an input unit 460, the controller 430 senses the request. For example, as shown in FIG. 12, if a key for storing the schedule information is selected, the controller 430 may sense the selected key as a request for registering the schedule information. The controller 430 drives a calendar application to store the schedule information in a memory 420. Here, the schedule information may include a title, time information, and place information. For example, a title may be a trip, the time information may be from 12 p.m. May 27, 2011 to 8 p.m. May 29, 2011, and the place information may be Busan Haeundae. Upon registration of the schedule information, the controller 430 may set whether to receive service information corresponding to the schedule information according to a user request. For example, the controller 430 may provide a check box for selecting reception of the service information through a screen for setting the schedule information. If the schedule information is made, the controller 430 checks the check box to set whether to receive service information corresponding to the schedule information and to store schedule information together therewith.

Subsequently, the controller 430 registers the schedule information in the calendar server 120 or 220 in step 513. That is, the controller 430 registers schedule information in the calendar server 120 or 220. At this time, the controller 430 transmits the schedule information to the calendar server 120 or 220. Here, the controller 430 may transmit ID information of the UE 400 together with the schedule information. That is, the controller 430 may register a calendar application in the calendar server 120 or 220 as well as the UE 400 through a calendar application. In this case, the controller 430 may register whether to receive service information corresponding to the schedule information together with the schedule information in the calendar server 120 or 220.

If the service information corresponding to the schedule information is received, the controller 430 senses the received service information in step 515. That is, if the service information is received through the RF communication unit 410, the controller 430 senses the received service information. In this case, the service information indicates a service provided from the service provider 140. For example, the service information may contain at least one of location information, menus, costs, a phone number or a home page address. In this case, the service information may be provided to the service provider 140 or another UE 240. The controller 430 may receive the service information from the calendar server 120 or 220. The controller 430 may receive service information through a Short Message Service (SMS), a Multimedia Message Service (MMS), an electronic mail service, or various types of SNS.

The controller 430 adds the service information to the schedule information in step 517. That is, the controller 430 stores the service information together with the schedule information. As shown in FIG. 13, the controller 430 may output an alarm message for notifying reception of the service information. That is, the controller 430 may enable a user of the UE 400 to recognize an update of the schedule information.

If a request for searching the schedule information is received, the controller 430 senses the received request in step 519. That is, if a request for searching the schedule information is received through the input unit 460, the controller 430 senses the received request. The controller 430 displays the schedule information in step 521. At this time, the controller 430 determines whether the service information is included in the schedule information. If the service information is not included in the schedule information, the controller 430 displays only the schedule information. Conversely, if the service information is included in the schedule information, the controller 430 displays the service information together with the schedule information.

Figure 10:
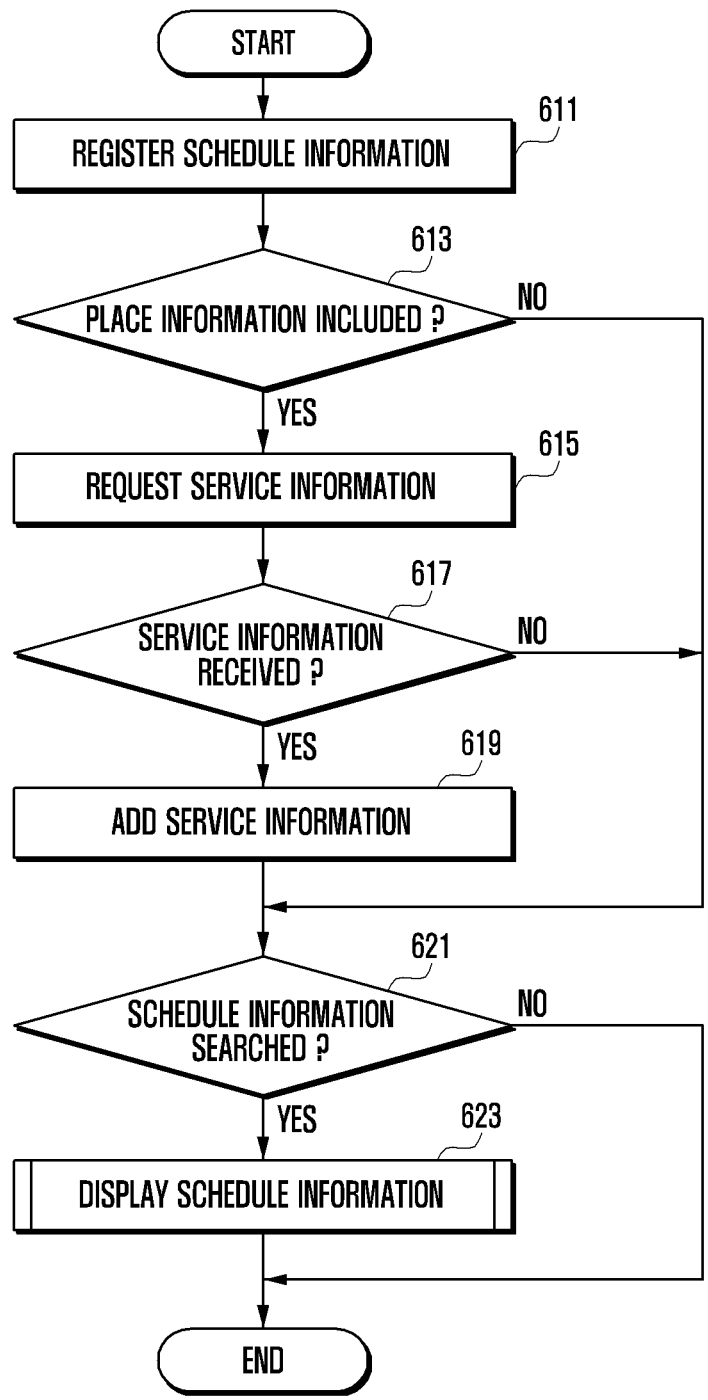
FIG. 10 is a flowchart illustrating a method for obtaining information of a UE in a communication system according to the third exemplary embodiment of the present invention.

FIG. 10 is a flowchart illustrating a method for obtaining information of a UE in a communication system according to a third exemplary embodiment of the present invention. FIG. 12 to FIG. 14 are views illustrating a method for obtaining information of a UE in a communication system according to exemplary embodiments of the present invention.

Referring to FIG. 10, a controller 430 registers schedule information in step 611. That is, if a request for registering schedule information is received through an input unit 460, the controller 430 senses the received request. For example, as shown in FIG. 12, if a key for storage of the schedule information is selected, the controller 430 may sense the selected key as a request for registering the schedule information. The controller 430 drives a calendar application to store the schedule information in the memory 420. Here, the schedule information may include a title, time information, and place information. For example, a title may be a trip, the time information may be from 12 p.m. May 27, 2011 to 8 p.m. May 29, 2011, and the place information may be Busan Haeundae. Upon registration of the schedule information, the controller 430 may set whether to receive service information corresponding to the schedule information according to a user request. For example, the controller 430 may provide a check box for selecting reception of the service information through a screen for setting the schedule information. If the schedule information is made, the controller 430 checks the check box to set whether to receive service information corresponding to the schedule information and to store schedule information together therewith.

The controller 430 determines whether the schedule information contains the place information in step 613. If the schedule information contains the place information, the controller 430 requests service information corresponding to the schedule information from the register server 330 in step 615. That is, the controller 430 transmits place information of the schedule information to the registration server 330 through the RF communication unit 410 to request the service information. At this time, if the schedule information contains the place information, the controller 430 may determine whether it is set to receive the service information corresponding to the schedule information. If it is set to receive the service information, the controller 430 may request service information corresponding to the schedule information to the registration server 330. If it is not set to receive the service information, although the schedule information contains the place information, the controller 430 may not request the service information corresponding to the schedule information to the registration server 330. Here, the service information indicates a service provided from a service provider (not shown). For example, the service information may contain at least one of location information, menus, costs, a phone number, or a home page address of the service provider.

Subsequently, if the service information corresponding to the schedule information is received, the controller 430 senses the received service information in step 617. That is, if the service information is received through the RF communication unit 410, the controller 430 senses the received service information. Here, the controller 430 may receive the service information through the Internet.

Subsequently, the controller 430 adds the service information to the schedule information in step 619. That is, the controller 430 stores the service information together with the schedule information. At this, time, as shown in FIG. 13, the controller 430 may output an alarm message for notifying reception of the service information. That is, the controller 430 may enable a user of the UE 400 to recognize update of the schedule information.

Finally, if a request for searching the schedule information is received, the controller 430 senses the received request in step 621. That is, if a request for searching schedule information is received through the input unit 460, the controller 430 senses the received request. The controller 430 displays the schedule information in step 623. At this time, the controller 430 determines whether service information is included in the schedule information. If the service information is not included in the schedule information, the controller 430 displays only the schedule information. Conversely, if the service information is included in the schedule information, the controller 430 displays the service information together with the schedule information.

Figure 11:
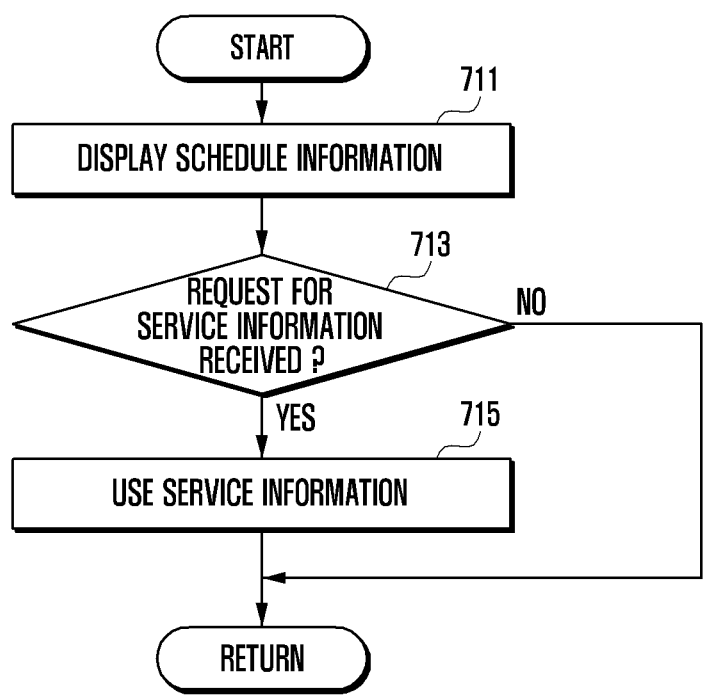
FIG. 11 is a flowchart illustrating an information displaying procedure shown in FIG. 9 and FIG. 10 according to an exemplary embodiment of the present invention.

FIG. 11 is a flowchart illustrating an information displaying procedure shown in FIG. 9 and FIG. 10 according to an exemplary embodiment of the present invention.

Referring to FIG. 11, the controller 430 displays service information together with the schedule information in step 711. For example, as shown in FIG. 14, the controller 430 may display the service information together with the schedule information. Through this, the user of the UE 400 may recognize the service information in association with the schedule information. That is, the user of the UE 400 may determine location based information corresponding to a schedule of the user. For example, the user of the UE 400 may determine that hotel Haeundae is located at Busan Haeundae corresponding to a trip place. The user of the UE 400 may determine a lodging cost and an address of hotel Haeundae.

If a request for using service information is received, the controller 430 senses the received request in step 713, and uses the service information in step 715. In this case, the controller 430 may transmit service information to the other UE 240 through an SNS. If the displayed service information is selected, the controller 430 may access a service provider 140 using the service information. For example, the controller 430 may request a call to the service provider 140 using a phone number of the service information. When call connection with the service provider 140 is achieved, the controller 430 may control the call with the service provider 140. The controller 430 may generate an electronic mail and transmit it to the service provider 140 using an electronic address of the service information. The controller 430 may access a web page of the service provider using a web page address of the service information. Through this, the user of the UE 400 may obtain additional information provided from the service provider 140 but excluded from the service information. For example, the user of the UE 400 may make a reservation at hotel Haeundae or obtain a coupon provided from the hotel Haeundae. Further, the user of the UE 400 may determine regional information around the hotel Haeundae.

In exemplary embodiments of the present invention, the UE may associate location based information corresponding to a place associated with schedule information with the schedule information to manage the location based information. That is, the user of the UE may easily obtain location based information from the UE without performing a separate information search or information recording. Through this, the UE may automatically add location based information to schedule information to manage the location based information. This may improve convenience for the user. In addition, use efficiency of the UE may be improved.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method comprising:
    registering an event associated with a user calendar containing place information;
    storing, by a calendar server, publication information including schedule information corresponding to the event and virtual information to identify a user equipment associated with the user calendar;
    in response to the event being registered with the user calendar, querying, by a server corresponding to one or more of the calendar server and a peripheral server, for location based information associated with a characteristic of the event based at least in part on the place information of the event;
    automatically editing, by the calendar server, the event so as to add the queried location based information associated with the characteristic of the event to the schedule information associated with the user calendar, in response to receipt of the location based information corresponding to the place information by the calendar server in a push scheme; and
    displaying the location based information when the event is searched,
    wherein the location based information refers to a location within a pre-set distance of the place information.

2. The method of claim 1, wherein the registering of the event comprises transmitting the place information to a peripheral server managing the location based information to request the location based information associated with the characteristic of the event.

3. The method of claim 1, wherein the registering of the event comprises transmitting the event to a peripheral server associated with a user equipment through a calendar application for managing the event.

4. The method of claim 1, wherein the registering of the event comprises:
    determining coordinate data corresponding to the place information by analyzing text included in the event; and
    registering the coordinate data as the place information.

5. The method of claim 1, wherein the displaying of the location based information comprises at least one of:
    sharing the location based information with a user equipment through a social networking service; and
    accessing a service provider using a phone number or a web page address associated with the location based information.

6. The method of claim 1, further comprising:
    requesting location based information associated with the characteristic of the event from a service provider corresponding to the place information by the peripheral server when the peripheral server receives the place information; and
    pushing the location based information to a user equipment by the calendar server when the location based information is received from the service provider.

7. The method of claim 1, further comprising transmitting previously registered location based information associated with the characteristic of the event to a service provider corresponding to the place information by the peripheral server when the place information is received.

8. The method of claim 1, further comprising:
    requesting location based information associated with the characteristic of the event of a service provider corresponding to the place information from a user equipment by the peripheral server when the place information is received; and
    pushing the location based information to the user equipment by the calendar server when the location based information is received from a service provider.

9. An apparatus comprising:
    a radio frequency communication unit for accessing a communication network;
    a controller configured to:
        register an event associated with a user calendar containing place information, store publication information including schedule information corresponding to the event and virtual information to identify a user equipment associated with the user calendar, query, in response to the event being registered with the user calendar, for location based information associated with a characteristic of the event based at least in part on the place information of the event, and automatically edit the event so as to add the queried location based information associated with a characteristic of the event corresponding to the place information to the schedule information associated with the user calendar, in response to receipt of the location based information which is pushed by a calendar server in a push scheme; and a display unit configured to display the location based information under control of the controller when the event is searched, wherein the location based information refers to a location within a pre-set distance of the place information.

10. The apparatus of claim 9, wherein the controller transmits the place information to a peripheral server managing the location based information to request the location based information associated with the characteristic of the event.

11. The apparatus of claim 9, wherein the controller transmits the event to a peripheral server associated with a user equipment through a calendar application for managing the event when the event is registered.

12. The apparatus of claim 9, wherein the controller or a peripheral server determines coordinate data corresponding to the place information by analyzing text included in the event, and registers the coordinate data as the place information.

13. The apparatus of claim 9, wherein the peripheral server requests location based information associated with the characteristic of the event from a service provider corresponding to the place information by the peripheral server when the place information is received, and pushes the location based information to a user equipment when the location based information is received from the service provider.

14. The apparatus of claim 9, wherein a peripheral server transmits previously registered location based information associated with the characteristic of the event to a service provider corresponding to the place information by the peripheral server when the place information is received.

15. The apparatus of claim 9, wherein a peripheral server requests location based information associated with the characteristic of the event of a service provider corresponding to the place information to a user equipment when the place information is received, and pushes the service information to the user equipment when the location based information is received from the other user equipment.

16. A system comprising:
a user equipment configured to execute a calendar application to manage an event associated with a user calendar; and
a calendar server operatively connected to the user equipment over a network and configured to:
store publication information including schedule information corresponding to the event and virtual information to identify the user equipment, and
to push the schedule information registered to the user equipment,
wherein the calendar server is configured to query, in response to the event being registered with the user calendar, for location based information associated with a characteristic of the event based at least in part on the place information of the event, to receive, from a peripheral server, location based information associated with a characteristic of the event, and to automatically edit the schedule information so as to add the received location based information to the corresponding event associated with the user calendar in response to receipt of the location based information, and
wherein the location based information refers to a location within a pre-set distance of the place information.

17. The system of claim 16, wherein the calendar server periodically synchronizes the event stored thereon with the event stored on the user equipment.

18. The system of claim 16, wherein the calendar server is configured to request, from a peripheral server, the location based information associated with the characteristic of the event.

19. The system of claim 18, wherein the calendar server is configured to push the location based information to the user equipment.

20. The system of claim 19, wherein the calendar server is configured to push the location based information corresponding to the event using a push scheme.

21. The system of claim 16, wherein the calendar server is configured to determine coordinate data for the corresponding event corresponding to text included in the event.

22. The system of claim 16, wherein the calendar server is configured to register with the peripheral server publication information associated with the event.

23. The system of claim 22, wherein the calendar server is configured to receive from the peripheral server location based information associated with the characteristic of the event associated with the publication information.

24. An apparatus comprising:
a communication unit configured to communicate with at least one user equipment and a peripheral server; and
a control unit configured to manage an event associated with a user calendar registered with the apparatus by the at least one user equipment,
wherein the control unit is further configured to
store publication information including schedule information corresponding to the event and virtual information to identity the user equipment,
query, in response to the event being registered with the user calendar, for location based information associated with a characteristic of the event based at least in part on the place information of the event, and
receive, from the peripheral server, location based information associated with the characteristic of the event, and to automatically edit the schedule information so as to add the received location based information to the corresponding event associated with the user calendar, in response to receipt of the location based information,
wherein the location based information refers to a location within a pre-set distance of the place information.

25. The apparatus of claim 24, wherein the control unit is configured to periodically synchronize the event stored thereon with the event stored on the corresponding at least one user equipment.

26. The apparatus of claim 24, wherein the control unit is configured to request, from the peripheral server, the location based information associated with the characteristic of the event.

27. The apparatus of claim 26, wherein the control unit is further configured to transmit the location based information to the corresponding at least one user equipment.

28. The apparatus of claim 27, wherein the control unit is further configured to transmit the location based information corresponding to the event using a push scheme.

29. The apparatus of claim 24, wherein the control unit is configured to determine coordinate data for the corresponding event by analyzing text included in the event.

30. The apparatus of claim 24, wherein the control unit is configured to register with the peripheral server publication information associated with event.

31. The apparatus of claim 30, wherein the control unit is further configured to receive from the peripheral server location based information associated with the publication information.

32. A method comprising:
  transmitting, by a user equipment, an event associated with a user calendar;
  storing, by a calendar server, publication information including schedule information corresponding to the event and virtual information to identify the user equipment;
  pushing, by the calendar server, the event registered therewith by the user equipment;
  receiving, from the peripheral server, location based information associated with a characteristic of the event; and
  automatically editing, by the calendar server, the event so as to add the received location based information to the corresponding schedule information associated with the user calendar, in response to receipt of the location based information,
  wherein the location based information refers to a location within a pre-set distance of the place information.

33. The method of claim 32, further comprising:
  periodically synchronizing the event stored on the calendar server with the event stored on the user equipment.

34. The method of claim 32, further comprising:
  transmitting a request to a peripheral server for the location based information associated with the characteristic of the event.

35. The method of claim 34, further comprising:
  pushing, by the calendar server, the location based information to the user equipment.

36. The method of claim 35, wherein the calendar server is configured to push the location based information corresponding to the event using a push scheme.

37. The method of claim 32, further comprising:
  determining, by the calendar server, coordinate data for the corresponding event by analyzing text included in the event.

38. The method of claim 32, further comprising:
  registering, by the calendar server, publication information associated with the event with the peripheral server.

39. The method of claim 38, further comprising:
  receiving, by the calendar server, location based information associated with the characteristic of the event associated with the publication information from the peripheral server.

* * * * *